July 28, 1953 K. E. ANDERSSON 2,647,001
FISHING ROD
Filed Dec. 28, 1946
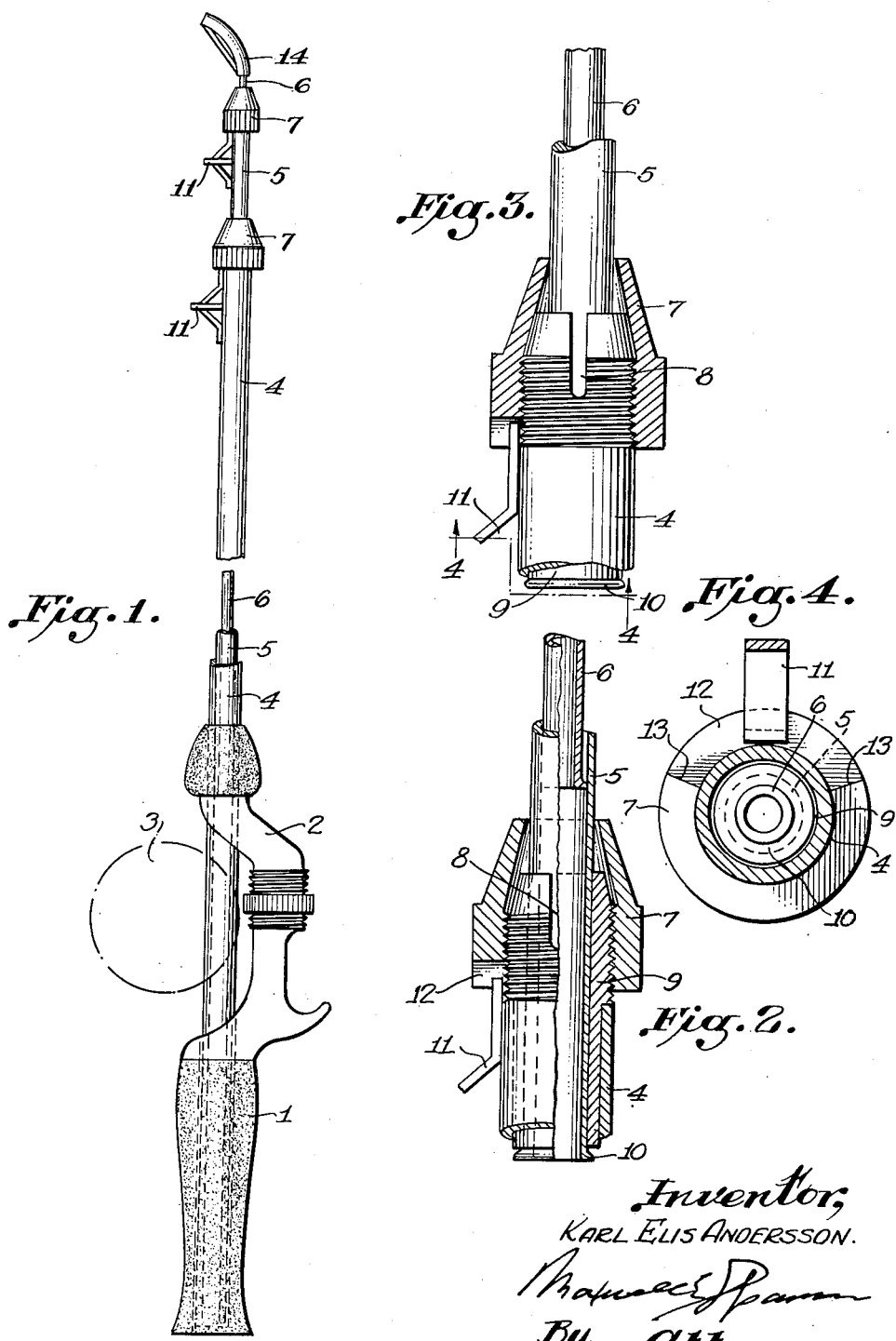
Inventor,
KARL ELIS ANDERSSON.
By Attorney.

Patented July 28, 1953

2,647,001

UNITED STATES PATENT OFFICE 2,647,001

FISHING ROD

Karl Elis Andersson, Enskede, Sweden

Application December 28, 1946, Serial No. 719,012
In Sweden February 25, 1946

3 Claims. (Cl. 287—58)

Fishing rods consisting of two or more parts which can be assembled so that the rod, when not in use, can easily be transported and kept in a dismounted condition, are already known. These known fishing rods, however, are marred by the drawback that their length is unchangeable and that rods with different lengths, suited for the particular kind of fishing, must be employed. Moreover, the assembling of the rod is somewhat laborious.

The present invention is intended to eliminate these drawbacks and relates to a fishing rod with an offset screw attachment for the reel and a detachable reel, and is characterized mainly by the feature that the rod consists of a plurality of tubes which can be telescoped, being arranged so that, after the detachment of the reel, they can be pushed into a hollow part arranged in the handle, with the object of obtaining the least possible length of the rod in its telescoped condition.

Additional features of the invention will be mentioned in the following specification with reference to the accompanying drawing which shows, by way of example, a possible embodiment of the invention. In the drawing Fig. 1 illustrates a fishing rod in accordance with the invention, partly in section; Fig. 2 is a fragmentary elevation of the rod partly in section on a larger scale showing the telescoped tubes in unlocked position; Fig. 3 is a view similar to Fig. 2 showing the tubes in locked position; and Fig. 4 is a section taken on line 4—4 of Fig. 3 and rotated clockwise through an angle of 90°.

In the drawing, 1 denotes the handle of the fishing rod, which is provided with an offset reel attachment 2, on which a reel 3 can be fixed in a known manner.

On the front end of the handle a tube 4 of a fixed suitable length is firmly arranged, in which tube a number of tubes 5, 6 (in the example shown two tubes) are telescopically arranged, and which, by means of special locking devices, can be locked in any drawn-out position.

With the object of attaining the least possible length of the rod in a telescoped condition, the rods 5, 6, after the detachment of the reel 3, can be telescoped and inserted in a cavity arranged in the handle 1.

According to the example shown, the tubes 4 and 5 are each provided with a locking device, consisting of an internally conical cap-nut 7, threaded on the outermost end of the tube. The latter, at two or three places, is provided with longitudinal slots 8 and is conically shaped outside, the conicity corresponding to the cap-nuts. In the position shown in Fig. 2, the nut 7 is screwed out so that the tube 5 can be freely drawn out or pushed in, whilst Fig. 3 shows the nut 7 screwed up, whereby the conical part of the nut presses together the parts of the tube situated between the slots 8, so that the tube 5 is locked in the desired position.

For practical purposes, each tube which is to receive another tube is provided at its front end with a bushing 9, in which the inner tube, e. g. tube 5, is guided, besides which the last-mentioned tube is provided with a collar 10, which serves as a stop device, so that the tube cannot be completely drawn out and removed from the outer tube.

The tubes 4 and 5 are moreover provided in a known way with rings 11 for the fishing line, which rings are firmly soldered near the tube ends. The nut 7, on part of its posterior end, is provided with a recess 12, the edges of which 13 form shoulders against the firmly soldered part of the ring 11, so that the nut can be turned merely so far as is necessary to tighten or release the slotted end of the tube.

The top tube 6, which forms the top end of the rod, is provided with a top ring 14, through which the fishing line runs.

The invention is not limited to the above described embodiment, illustrated in the drawing, the details of which may be combined and varied in any way without limiting or exceeding the scope of the protection. In particular, it should be noted that the number of tubes that can be telescoped is by no means limited to the number shown.

Having thus described my invention what I claim as new and desire to secure by Letters Patent, is:

1. In a fishing rod, the combination of an elongated tubular fishing rod member, an internal bushing extending from one end of said member and formed with a split tapered extremity and with threads adjacent said tapered extremity, an inner fishing rod element slidable in the bore of said tubular fishing rod member and formed with an annular flange on one end engageable with the inner end of said bushing to limit the withdrawal of said inner fishing rod element from said tubular fishing rod member, a nut engaging said threads and provided with a tapered bore at one end engageable with said split tapered extremity to tighten the latter about said inner rod element, and means fixed on said tubular rod member limiting the rotation of said nut.

2. In a fishing rod, the combination of an elongated tubular fishing rod member, a bushing in said rod member extending out of one end thereof, the outer end of said bushing being externally tapered, external threads formed on said bushing adjacent said tapered end, longitudinally extending slots formed in said tapered end, an inner fishing rod element slidable in said bushing and having an annular flange on the end thereof within said tubular rod member for engagement with the inner end of said bushing to thereby limit the withdrawal of said inner rod element from said tubular rod member, a nut threaded on the threads of said bushing and formed with a tapered bore at one end engageable with said tapered slotted end of said bushing for tightening the latter upon said inner rod element, and means limiting the rotation of said nut.

3. In a fishing rod, the combination according to claim 2, wherein said last mentioned means includes a recess formed in the other end of said nut extending over a predetermined angle, and a stop fixed on said tubular rod member extending into said recess and limiting the rotation of said nut to less than said angle.

KARL ELIS ANDERSSON.

References Cited in the file of this patent

UNITED STATES PATENTS

| Number | Name | Date |
|---|---|---|
| 386,078 | McCormick | July 10, 1888 |
| 768,452 | Hennessy | Aug. 23, 1904 |
| 1,022,983 | Thunberg | Apr. 9, 1912 |
| 1,033,430 | Matheson | July 23, 1912 |
| 1,385,149 | Rawson | July 19, 1921 |
| 1,428,601 | McGuckin | Sept. 12, 1922 |
| 1,731,173 | Pope | Oct. 8, 1929 |
| 1,888,158 | Browne | Nov. 15, 1932 |
| 2,184,358 | Moore | Dec. 26, 1939 |
| 2,218,841 | Bluemel | Oct. 22, 1940 |
| 2,226,897 | Cole | Dec. 31, 1940 |
| 2,382,291 | Carlberg | Aug. 14, 1945 |
| 2,465,734 | Lewin | Mar. 29, 1949 |

FOREIGN PATENTS

| Number | Country | Date |
|---|---|---|
| 59,331 | Denmark | Dec. 22, 1941 |
| 470,745 | Germany | Jan. 30, 1929 |